(12) United States Patent
Kim

(10) Patent No.: US 8,910,972 B1
(45) Date of Patent: Dec. 16, 2014

(54) AIRBAG DOOR

(71) Applicant: Hyundai Mobis Co., Ltd., Seoul (KR)

(72) Inventor: Hong Jong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/227,818

(22) Filed: Mar. 27, 2014

(30) Foreign Application Priority Data

Jul. 29, 2013 (KR) .................. 10-2013-0089599

(51) Int. Cl.
*B60R 21/205* (2011.01)
*B60R 21/215* (2011.01)
*B60R 21/16* (2006.01)

(52) U.S. Cl.
CPC ......... B60R 21/215 (2013.01); *B60R 2021/161* (2013.01)
USPC ....................... 280/728.3; 280/728.2; 280/732

(58) Field of Classification Search
USPC .......................... 280/728.2, 728.3, 732, 743.1
See application file for complete search history.

(56) References Cited

U.S. PATENT DOCUMENTS

| | | | |
|---|---|---|---|
| 5,035,444 A * | 7/1991 | Carter ........................... | 280/732 |
| 5,046,758 A * | 9/1991 | Rafferty et al. ............... | 280/732 |
| 5,292,151 A * | 3/1994 | Parker ......................... | 280/728.3 |
| 5,303,951 A * | 4/1994 | Goestenkors et al. ..... | 280/728.3 |
| 5,316,335 A * | 5/1994 | Gray et al. ................. | 280/728.3 |
| 5,360,231 A * | 11/1994 | Adams ....................... | 280/728.2 |
| 5,429,385 A * | 7/1995 | Kamiji et al. .............. | 280/728.3 |
| 5,482,313 A * | 1/1996 | Ikeya et al. ................ | 280/728.2 |
| 5,527,065 A * | 6/1996 | Saberan et al. ............ | 280/728.3 |
| 5,556,126 A * | 9/1996 | Lee ............................ | 280/728.3 |
| 5,887,891 A * | 3/1999 | Taquchi et al. ............ | 280/728.2 |
| 6,394,486 B1 * | 5/2002 | Fujimura et al. ........... | 280/728.2 |
| 6,460,874 B1 * | 10/2002 | McDonnell et al. ....... | 280/728.2 |
| 7,093,849 B2 * | 8/2006 | Nishijima et al. ......... | 280/728.3 |
| 7,232,151 B2 * | 6/2007 | Hayashi et al. ............. | 280/732 |
| 7,275,759 B2 * | 10/2007 | Sawada ....................... | 280/728.3 |
| 7,854,447 B2 * | 12/2010 | Kanno ....................... | 280/728.3 |
| 8,336,906 B2 * | 12/2012 | Kim et al. .................. | 280/728.3 |
| 8,690,184 B2 * | 4/2014 | Yoshimura et al. ........ | 280/728.2 |

* cited by examiner

*Primary Examiner* — Paul N Dickson
*Assistant Examiner* — Laura Freedman
(74) *Attorney, Agent, or Firm* — Knobbe Martens Olson & Bear LLP

(57) ABSTRACT

Provided is an airbag door in which a front rib and a rear rib are formed integrally with a door plate, and a hook, which forms a catching region with a crash pad, is formed on the front rib, the airbag door including: a catching amount increasing portion which is formed to protrude at an inner side of the front rib which is directed toward an airbag deployment space, and leads a deployment direction of the airbag toward the rear rib so that the catching region is increased, and the airbag door provides an advantageous effect that prevents the hook from being separated from the crash pad when the airbag is deployed, thereby preventing the airbag from being abnormally deployed.

5 Claims, 3 Drawing Sheets

AIRBAG DOOR

CROSS-REFERENCE TO RELATED APPLICATIONS

This application claims priority to and the benefit of Korean Patent Application No. 10-2013-0089599 filed in the Korean Intellectual Property Office on Jul. 29, 2013, the entire contents of which are incorporated herein by reference.

TECHNICAL FIELD

The present invention relates to an airbag door, and more particularly, to an integral type airbag door that is disposed on a crash pad.

BACKGROUND ART

An airbag module is installed in a vehicle so as to protect an occupant at the time of a vehicle collision. Particularly, an airbag module, which protects an occupant seated on a front passenger seat, is installed inside a crash pad of the vehicle. Therefore, an airbag door, which is opened when an airbag is deployed, is formed on the crash pad so that the airbag may be deployed toward the occupant.

The airbag door may be formed so that a part of an inner side of the crash pad is cut out by an impact.

FIG. 1 is a view illustrating an airbag door formed on a crash pad.

Referring to FIG. 1, an airbag door 10 may include a door plate 11, a front rib 12, and a rear rib 13. F of FIG. 1 indicates a front side of a vehicle, and R of FIG. 1 indicates a rear side of the vehicle, that is, a direction toward an occupant.

The door plate 11 is a portion that is opened so that an airbag being deployed may come to the outside while a fractured portion P is fractured and rotated about a hinge region H by the airbag being deployed. The front rib 12 and the rear rib 13 are formed below the door plate 11, and coupled with an airbag module 2 so as to serve to guide the deployment of the airbag.

In this case, a hook 12a, which forms a catching region with a crash pad 1, is formed on the front rib 12.

However, the hook 12a may be separated from the crash pad 1 by pressure of an inflator of an airbag module when the airbag is deployed. In a case in which the hook 12a is separated from the crash pad 1, the airbag is abnormally deployed, which may cause a fatal problem with safety of the occupant.

SUMMARY OF THE INVENTION

Embodiments of the present invention are directed to an airbag door which prevents a front rib from being separated from a crash pad when an airbag is deployed, such that the airbag is normally deployed.

An embodiment of the present invention provides an airbag door in which a front rib and a rear rib are formed integrally with a door plate, and a hook, which forms a catching region with a crash pad, is formed on the front rib, the airbag door including: a catching amount increasing portion which is formed to protrude at an inner side of the front rib which is directed toward an airbag deployment space, and leads a deployment direction of the airbag toward the rear rib so that the catching region is increased.

A plurality of catching amount increasing portions may be disposed to be spaced apart from each other in a width direction of the front rib.

The catching amount increasing portion may be formed integrally with the front rib.

The catching amount increasing portion may be made of the same material as the front rib.

A slot into which the catching amount increasing portion is mounted may be formed at the inner side of the front rib.

According to the airbag door according to the embodiment of the present invention, a catching amount increasing portion, which leads the deployment direction of the airbag to be tilted toward the front rib and increases the catching region between the hook formed on the front rib and the crash pad, is provided, thereby preventing the hook from being separated from the crash pad when the airbag is deployed, and the airbag from being abnormally deployed.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
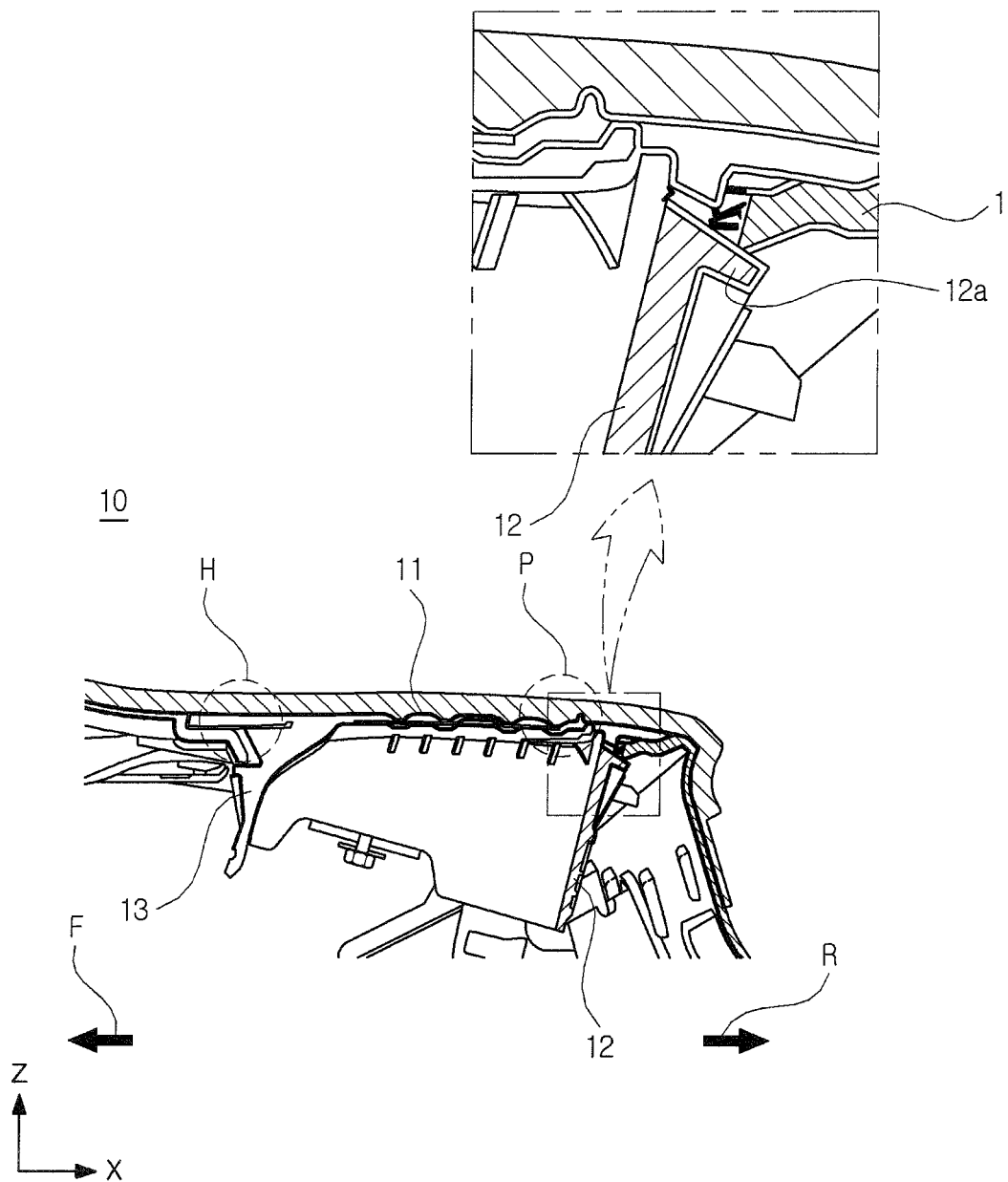
FIG. 1 is a view illustrating an airbag door formed on a crash pad.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, embodiments according to the present invention will be described in detail with reference to the accompanying drawings. First, in denoting reference numerals to constituent elements of respective drawings, it should be noted that the same elements will be designated by the same reference numerals although they are shown in different drawings. Hereinafter, an embodiment of the present invention will be described, but, of course, the technical spirit of the present invention is not restricted or limited thereto, but the embodiment of the present invention may be modified by a person with ordinary skill in the art to be variously performed.

Figure 2:
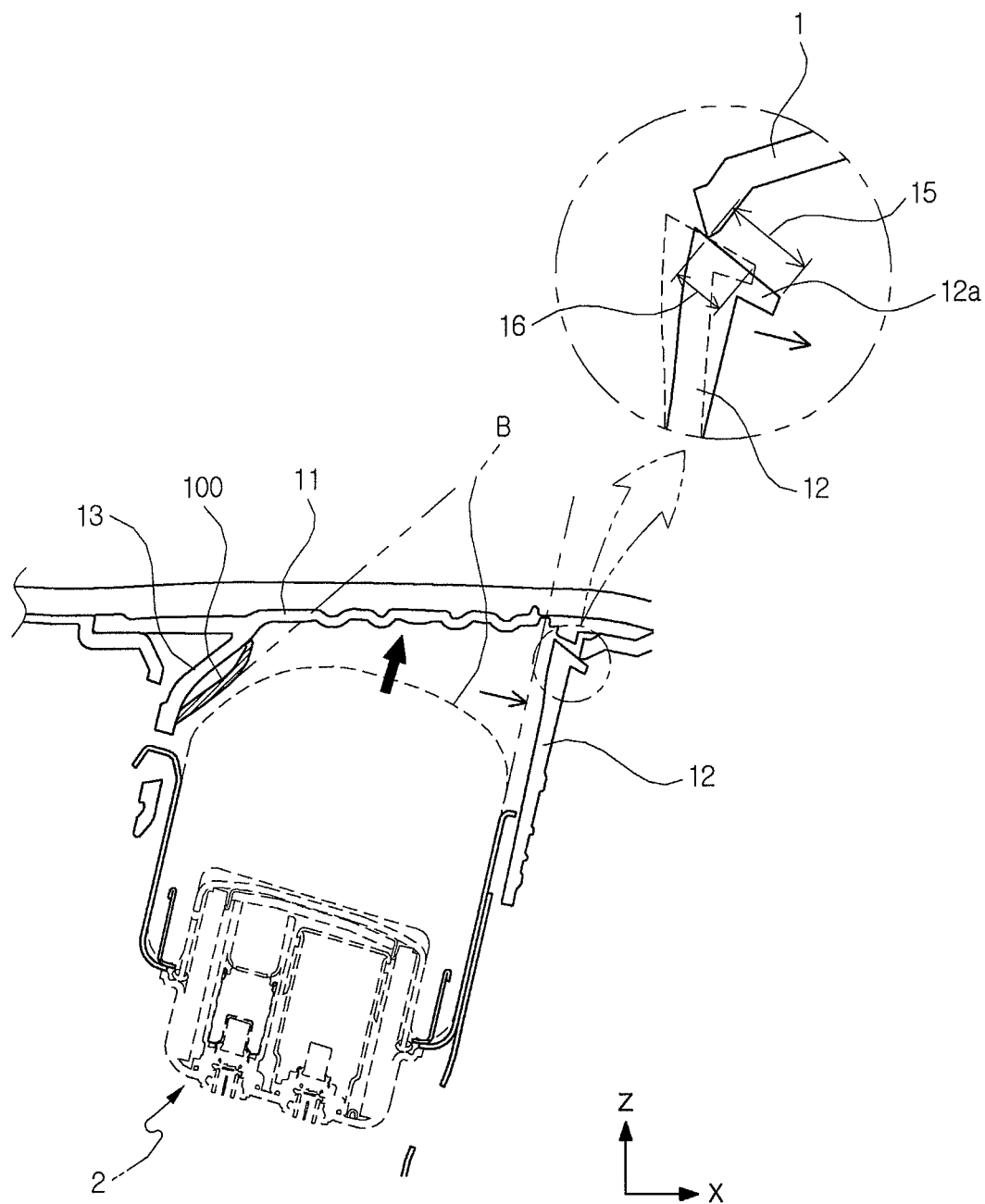
FIG. 2 is a view illustrating an airbag door according to an embodiment of the present invention.
Figure 3:
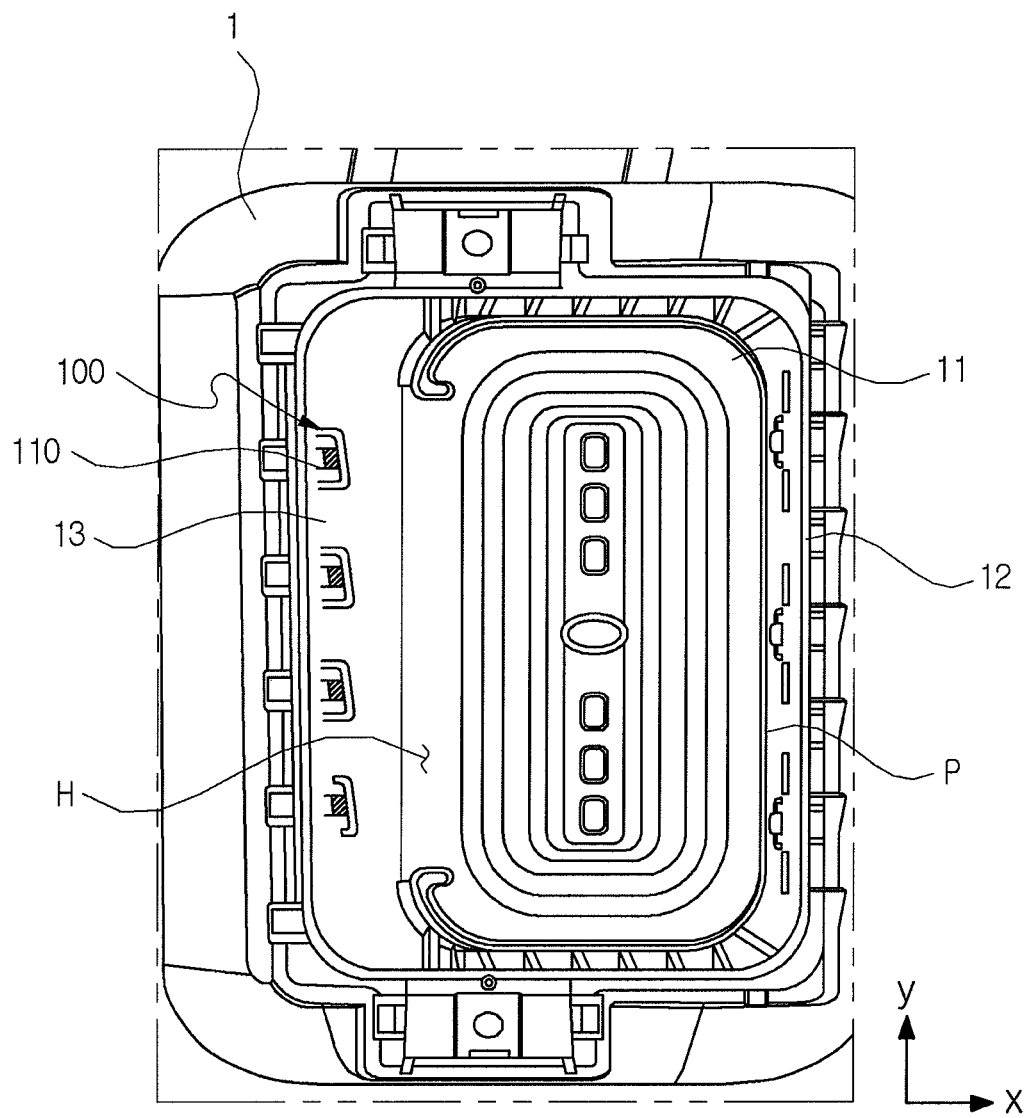
FIG. 3 is a view illustrating the airbag door of FIG. 2 when viewed in a direction from a lower side to an upper side.

FIG. 2 is a view illustrating an airbag door according to an embodiment of the present invention, and FIG. 3 is a view illustrating the airbag door of FIG. 2 when viewed in a direction from a lower side to an upper side.

FIGS. 2 and 3 clearly illustrate only main characteristic parts for conceptual and clear understanding of the embodiment of the present invention. As a result, various modifications to the illustrations are expected, and the scope of the present invention does not have to be limited to specific shapes illustrated in the drawings.

First, an airbag door according to an embodiment of the present invention includes a front rib 12 and a rear rib 13 that are integral with the door plate 11. The front rib 12 and the rear rib 13 may face each other, and an airbag B is deployed between the front rib 12 and the rear rib 13. Here, the "front" means a direction toward a driver based on an x-axis direction in FIG. 2, and the "rear" means a direction toward a front side of a vehicle based on the x-axis direction in FIG. 2.

A hook 12a is disposed on the front rib 12, and the hook 12a is in contact with a crash pad 1 so as to define a catching region, and serves to prevent the entire airbag door from being moved away by the deployment of the airbag.

Referring to FIG. 3, H of FIG. 3 indicates a hinge region that is not fractured when the airbag is deployed so that the door plate 11 is rotated, and P of FIG. 3 indicates a fractured portion that is fractured when the airbag is deployed so as to allow the door plate 11 to be opened.

The hinge region H may be formed at the rear rib 13 side, and the fractured portion 9 may be formed at the front rib 12 side.

The airbag door according to the embodiment of the present invention includes a catching amount increasing portion 100 disposed on the rear rib 13.

The catching amount increasing portion 100 serves to lead a deployment direction of the airbag B toward the front rib 12. That is, the catching amount increasing portion 100 leads the airbag B to be deployed and tilted toward the front rib 12 rather than a deployment direction of the airbag B which is led by the rear rib 13.

The catching amount increasing portion 100 may protrude from an inner side of the rear rib 13 which is directed toward an airbag deployment space. The catching amount increasing portion 100 defines a contact surface with the airbag B further inside the airbag deployment space than the rear rib 13.

A plurality of catching amount increasing portions 100 may be provided and spaced apart from each other in a width direction of the rear rib 13 (a y-axis direction of FIG. 3). The catching amount increasing portion 100 may be integral with the rear rib 13, but a separate slot 110 for mounting the catching amount increasing portion 100 may be disposed at the inner side of the rear rib 13, as illustrated in FIG. 3.

The catching amount increasing portion 100 may be made of the same material as the rear rib 12.

When the airbag is deployed, the deployment direction of the airbag is tilted toward the front rib 12 by the catching amount increasing portion 100. Therefore, because the hook 12a of the front rib 12 is further pushed to the right side of FIG. 2 by the airbag being deployed, a catching region 15 of the hook 12a with respect to the crash pad 1 when the airbag is deployed is more increased than a catching region 16 of the hook 12a with respect to the crash pad 1 when the airbag is not deployed. Therefore, the hook 12a may be prevented from being separated from the crash pad 1 by the airbag being deployed.

As described above, the embodiments have been described and illustrated in the drawings and the specification. The embodiments were chosen and described in order to explain certain principles of the invention and their practical application, to thereby enable others skilled in the art to make and utilize various embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An airbag door comprising:
a door plate;
a front rib integral with the door plate;
a rear rib integral with the door plate;
a hook disposed on the front rib and defining a catching region with a crash pad; and
a catching amount increasing portion protruding from an inner side of the rear rib facing an airbag deployment space,
wherein the catching amount increasing portion leads a deployment direction of an airbag toward the front rib so that the catching region is increased.

2. The airbag door of claim 1, wherein a plurality of catching amount increasing portions is spaced apart from each other in a width direction of the rear rib.

3. The airbag door of claim 1, wherein the catching amount increasing portion is integral with the rear rib.

4. The airbag door of claim 1, wherein the catching amount increasing portion is made of the same material as the rear rib.

5. The airbag door of claim 1, wherein a slot into which the catching amount increasing portion is mounted is provided at the inner side of the rear rib.

* * * * *